United States Patent
Kuo

(10) Patent No.: US 9,376,159 B2
(45) Date of Patent: Jun. 28, 2016

(54) DIRECTION RESTRICTING DEVICE FOR THE INNER AND OUTER TUBES OF A BICYCLE SEAT POST

(71) Applicant: Taiwan Hodaka Industrial Co., Ltd., Taipei (TW)

(72) Inventor: Frank Kuo, Taipei (TW)

(73) Assignee: Taiwan Hodaka Industrial Co. Ltd., Taipei (TW)

( * ) Notice: Subject to any disclaimer, the term of this patent is extended or adjusted under 35 U.S.C. 154(b) by 215 days.

(21) Appl. No.: 13/913,563

(22) Filed: Jun. 10, 2013

(65) Prior Publication Data

US 2014/0205372 A1    Jul. 24, 2014

(30) Foreign Application Priority Data

Jan. 24, 2013   (TW) ............................... 102201607 U

(51) Int. Cl.
| | | |
|---|---|---|
| *B25G 3/02* | (2006.01) | |
| *B62K 19/36* | (2006.01) | |
| *F16B 7/10* | (2006.01) | |
| *B62J 1/08* | (2006.01) | |

(52) U.S. Cl.
CPC . *B62K 19/36* (2013.01); *B62J 1/08* (2013.01); *F16B 7/10* (2013.01); *B62J 2001/085* (2013.01); *Y10T 403/7026* (2015.01)

(58) Field of Classification Search
CPC ........ B62J 2001/085; B62J 1/08; A47C 3/40; Y10T 403/32467; Y10T 403/32475; Y10T 403/32501; Y10T 403/7051; Y10T 403/7026; F16B 7/10; B62K 19/36; F16C 3/035
USPC ...................... 280/220; 297/344.18
See application file for complete search history.

(56) References Cited

U.S. PATENT DOCUMENTS

| | | | | |
|---|---|---|---|---|
| 4,667,530 | A * | 5/1987 | Mettler et al. | 74/493 |
| 4,826,192 | A * | 5/1989 | Borromeo | B62J 1/08 248/157 |
| 5,044,648 | A * | 9/1991 | Knapp | 280/283 |
| 5,152,627 | A * | 10/1992 | Arnold | 403/109.3 |
| 6,145,862 | A | 11/2000 | D'Aluisio et al. | |
| 6,343,993 | B1 * | 2/2002 | Duval | B62D 1/16 384/49 |
| 6,533,459 | B2 * | 3/2003 | Podhajecki et al. | 384/57 |
| 6,557,433 | B1 * | 5/2003 | Castellon | B62D 1/185 403/359.1 |
| 6,604,886 | B2 * | 8/2003 | Kinzler et al. | 403/370 |
| 6,620,050 | B2 * | 9/2003 | Park | 464/162 |
| 7,322,607 | B2 * | 1/2008 | Yamada | B62D 1/16 280/755 |
| 7,416,216 | B2 * | 8/2008 | Shoda et al. | 280/775 |
| 7,422,224 | B2 * | 9/2008 | Sicz et al. | 280/274 |
| 7,526,978 | B2 * | 5/2009 | Bahr | F16C 3/035 464/167 |

(Continued)

*Primary Examiner* — Daniel P Stodola
*Assistant Examiner* — Matthew R McMahon
(74) *Attorney, Agent, or Firm* — Alan D. Kamrath; Kamrath IP Lawfirm, P.A.

(57) ABSTRACT

A direction restricting device, for the inner and outer tubes of a bicycle seat post, includes at least one axial groove arranged on the wall of one of the tubes, and a direction restricting element fastened to the other tube at the position relative to the axial groove wall. The direction restricting element may be inserted into the axial groove and at least includes an elastic slider provided with an axial opening in the middle. The direction restricting element may be inserted into the axial outer walls of the direction restricting element to engage with the axial inner walls of the axial groove to eliminate the interspace between the slider and the axial groove to prevent deflection and wobbling and to reinforce the steadiness of both tubes when the inner and outer tubes rotate relative to each other.

12 Claims, 20 Drawing Sheets

(56) References Cited

U.S. PATENT DOCUMENTS

| | | | |
|---|---|---|---|
| 7,607,855 B2 * | 10/2009 | Lai | 403/109.5 |
| 8,157,659 B2 * | 4/2012 | Kakutani | B62D 1/16 464/167 |
| 8,398,496 B2 * | 3/2013 | Bahr | B62D 1/16 384/10 |
| 8,573,624 B2 * | 11/2013 | Morelli | 280/288.4 |
| 8,801,525 B2 * | 8/2014 | Fredriksson | B62D 1/16 464/168 |
| 8,931,805 B2 * | 1/2015 | Buzzard | F16D 3/065 280/775 |
| 2001/0006564 A1 * | 7/2001 | Geyer | F16C 3/035 384/49 |
| 2006/0078376 A1 * | 4/2006 | Liao | 403/378 |
| 2008/0314190 A1 * | 12/2008 | Miyawaki | B62D 1/185 74/496 |
| 2011/0097139 A1 * | 4/2011 | Hsu | 403/109.1 |
| 2012/0027510 A1 * | 2/2012 | Chen | 403/374.2 |

* cited by examiner

DIRECTION RESTRICTING DEVICE FOR THE INNER AND OUTER TUBES OF A BICYCLE SEAT POST

BACKGROUND OF THE INVENTION

1. Field of the Invention

The present invention relates to a direction restricting device for the inner and outer tubes of a bicycle seat post and, more specifically, to a structure that may eliminate the rotary interspace between the inner tube and the outer tube of a bicycle seat post to prevent deflection and wobble when said inner and outer tubes rotate relative to each other.

2. Description of the Prior Art

The seat post is used for supporting the seat, and, normally, the seat post of a bicycle includes at least an outer tube and an inner tube joined to each other to adjust the seat height. In order to prevent the outer tube and the inner tube from rotating, generally, a direction restricting device is arranged between the inner and outer tubes to limit the inner tube to axial movements, such as the direction restricting arrangement of the bicycle suspension system disclosed in U.S. Pat. No. 6,145,862. According to FIG. 3B shown in U.S. Pat. No. 6,145,862, a plurality of sets of opposing flats is arranged between the outer tube and the inner tube, and needle bearings are disposed between the opposing flats to allow the inner tube to freely slide within the outer tube. However, the height of the needle bearings may become varied after operating for a long time. That is, the needle bearings may not stay in the same horizontal position relative to the height, because the contacted friction planes and the friction resistances between the outer tube and the inner tube are different. Therefore, the measurement or height that the inner tube moves axially within the outer tube will be affected. In order to ameliorate the aforementioned drawback, the seat post needs to be taken apart to adjust the needle bearings to stay in the same horizontal position relative to the height. In addition, an interspace occurs between the axial walls of the aforesaid opposing flats between the outer tube and the inner tube, and said interspace may cause deflection and wobbling of the tubes when the inner and outer tubes rotate.

It is against this background and the problems associated therewith that the present invention has been developed.

SUMMARY OF THE INVENTION

It is a primary object of the present invention to provide a direction restricting device for the inner and outer tubes of a bicycle seat post that may not only restrict the axial movement of the inner tube but also eliminate the rotary interspace between the inner tube and the outer tube of a bicycle seat post to prevent deflection and wobble of the inner and outer tubes when they rotate relative to each other.

The present invention is characterized in that the direction restricting device includes at least one axial groove arranged on the wall of one of the inner and outer tubes, and a direction restricting element fastened to the other tube at the position relative to the axial groove wall. Said direction restricting element may be inserted into the axial groove and at least includes an elastic slider provided with an axial opening in the middle. The direction restricting element may be inserted into the axial groove to enable the axial outer walls of the direction restricting element to engage with the axial inner walls of the axial groove to eliminate the interspace between the slider and the axial groove to prevent deflection and wobbling and to reinforce the steadiness of both tubes when the inner and outer tubes rotate relative to each other.

DETAILED DESCRIPTION OF EMBODIMENTS OF THE INVENTION

The means for achieving the aforesaid objective and the functions of the present invention will become apparent from the following description, taken in connection with the accompanying drawings, wherein a preferred embodiment of the present invention is disclosed.

Figure 1:
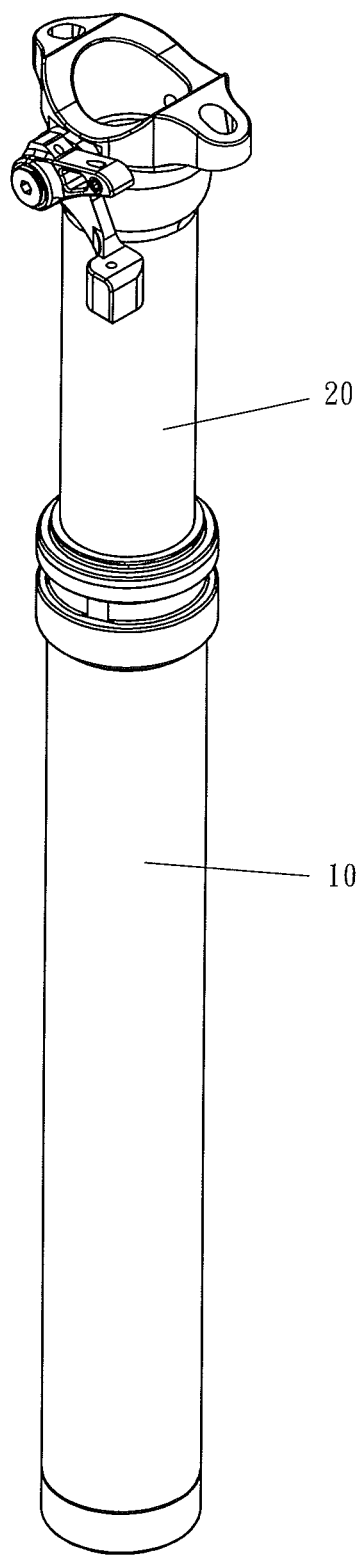
FIG. 1 is a stereogram of the seat post in accordance with a first embodiment of the present invention.
Figure 2:
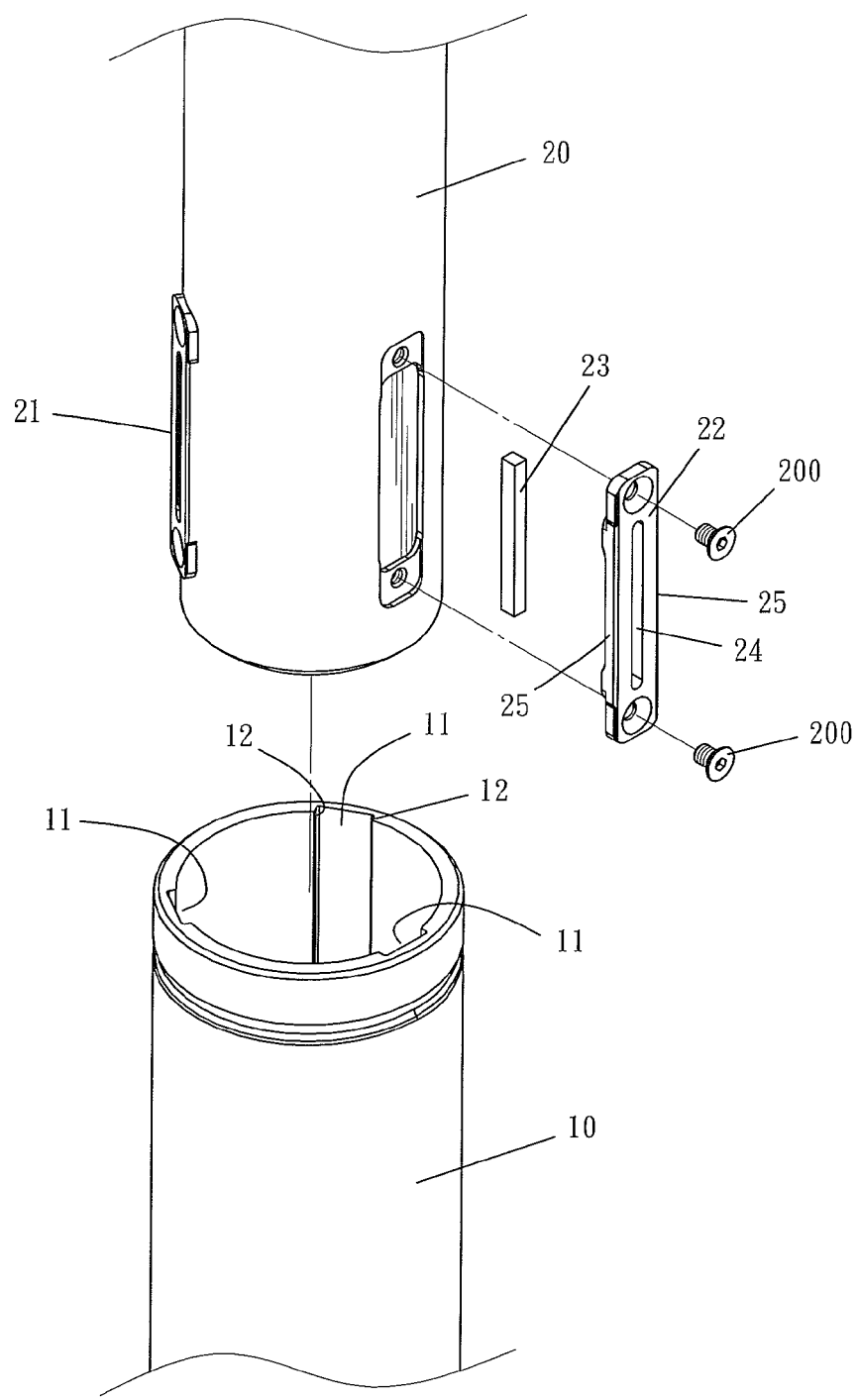
FIG. 2 is an exploded view of a portion of a first embodiment of the present invention.
Figure 3:
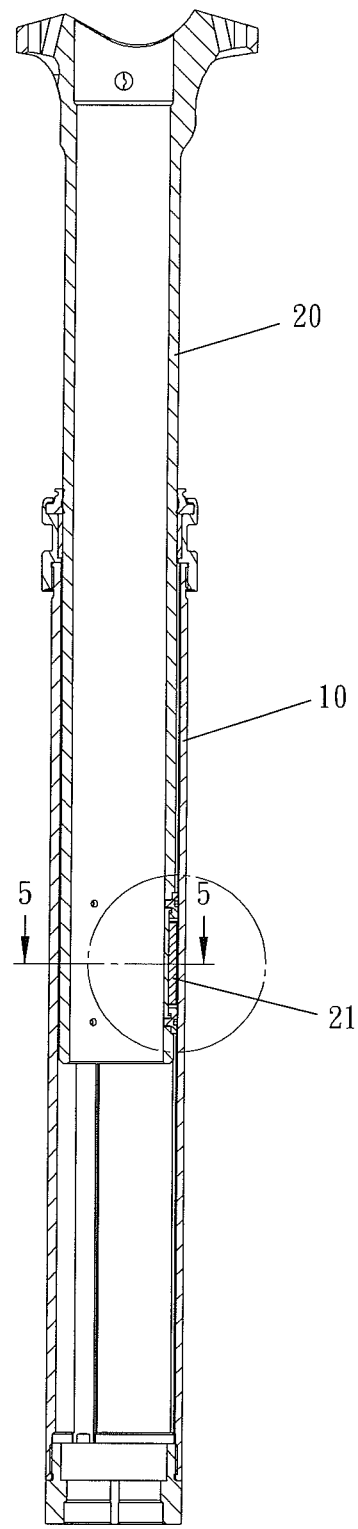
FIG. 3 is a cutaway view of a first embodiment of the present invention in a complete assembled mode.
Figure 4:
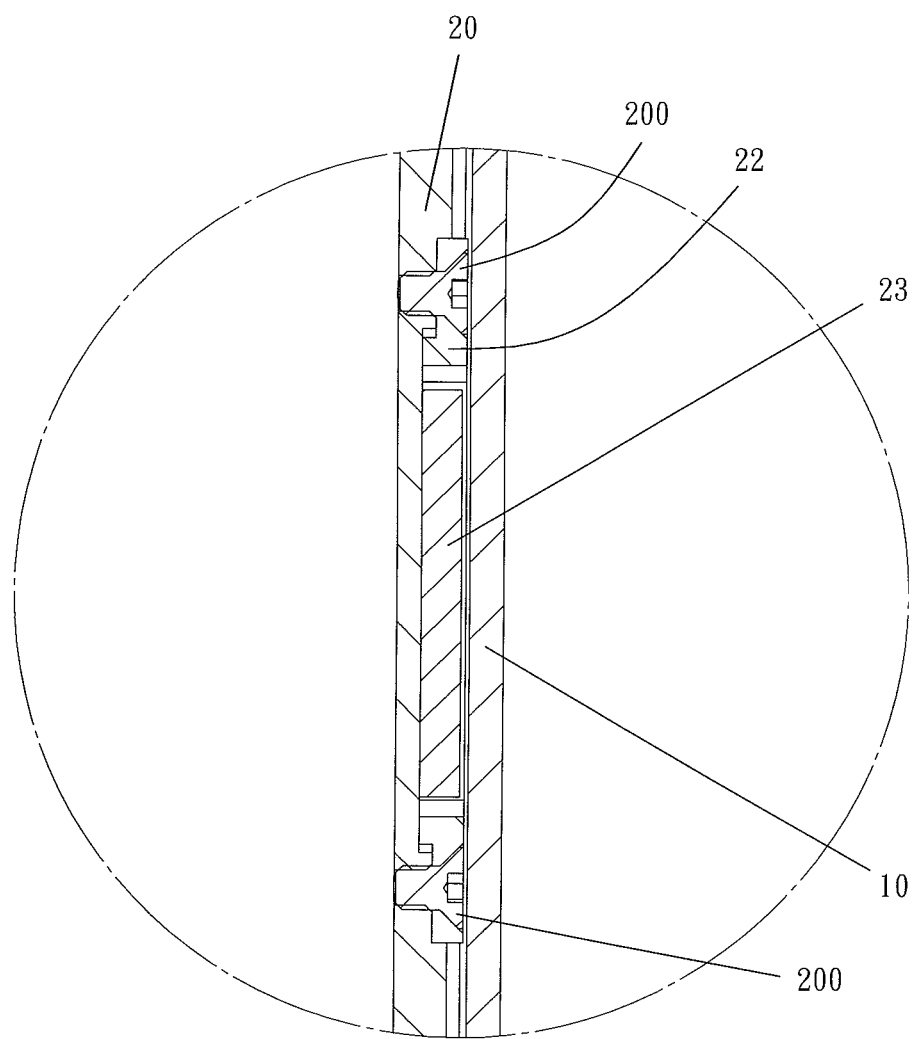
FIG. 4 is an enlarged view of a portion of FIG. 3.
Figure 5:
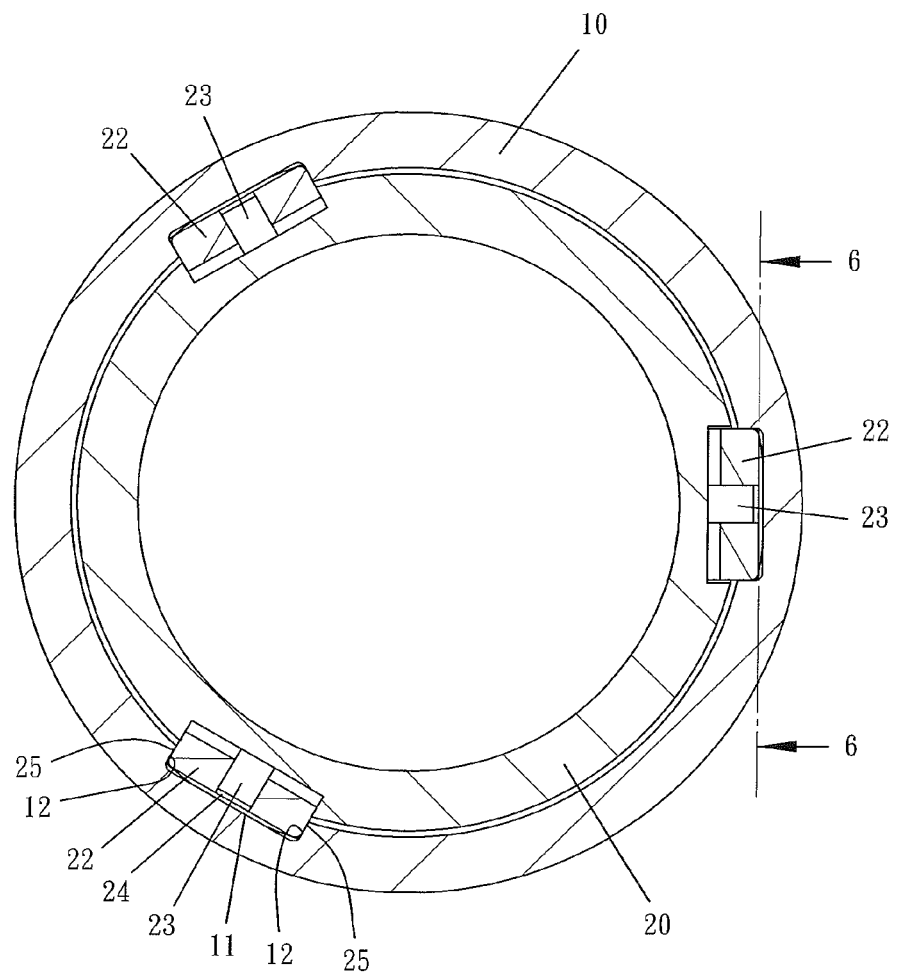
FIG. 5 is a cross-sectional view along line 5-5 shown in FIG. 3.
Figure 6:
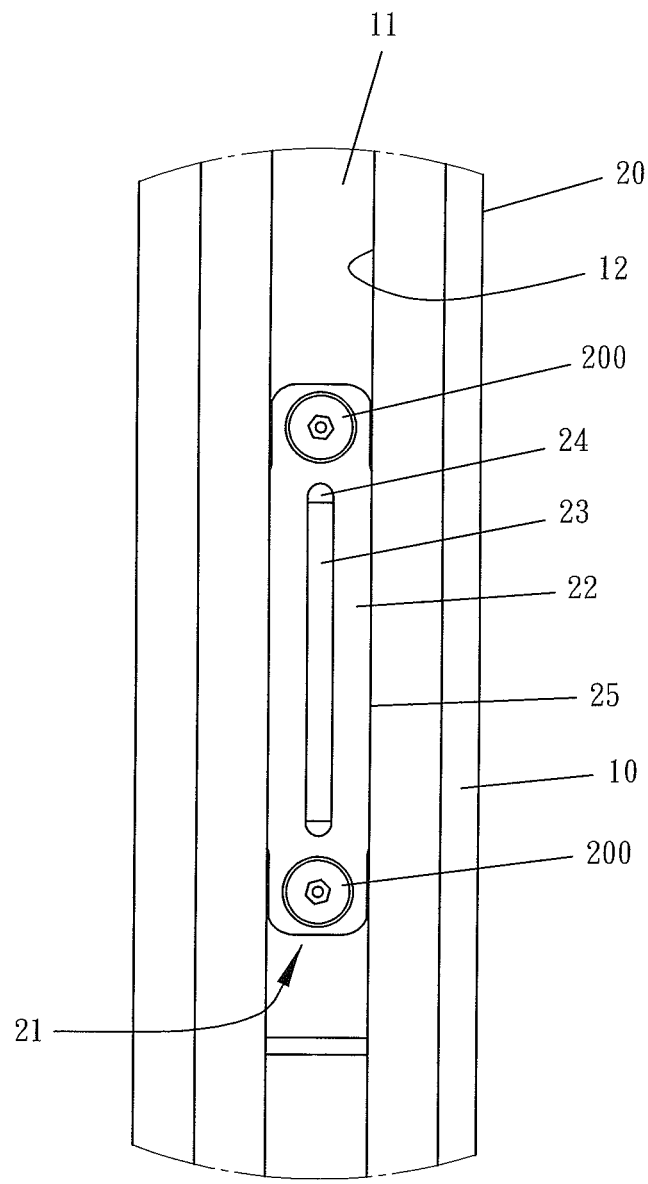
FIG. 6 is a cutaway view along line 6-6 shown in FIG. 5.
Figure 7:
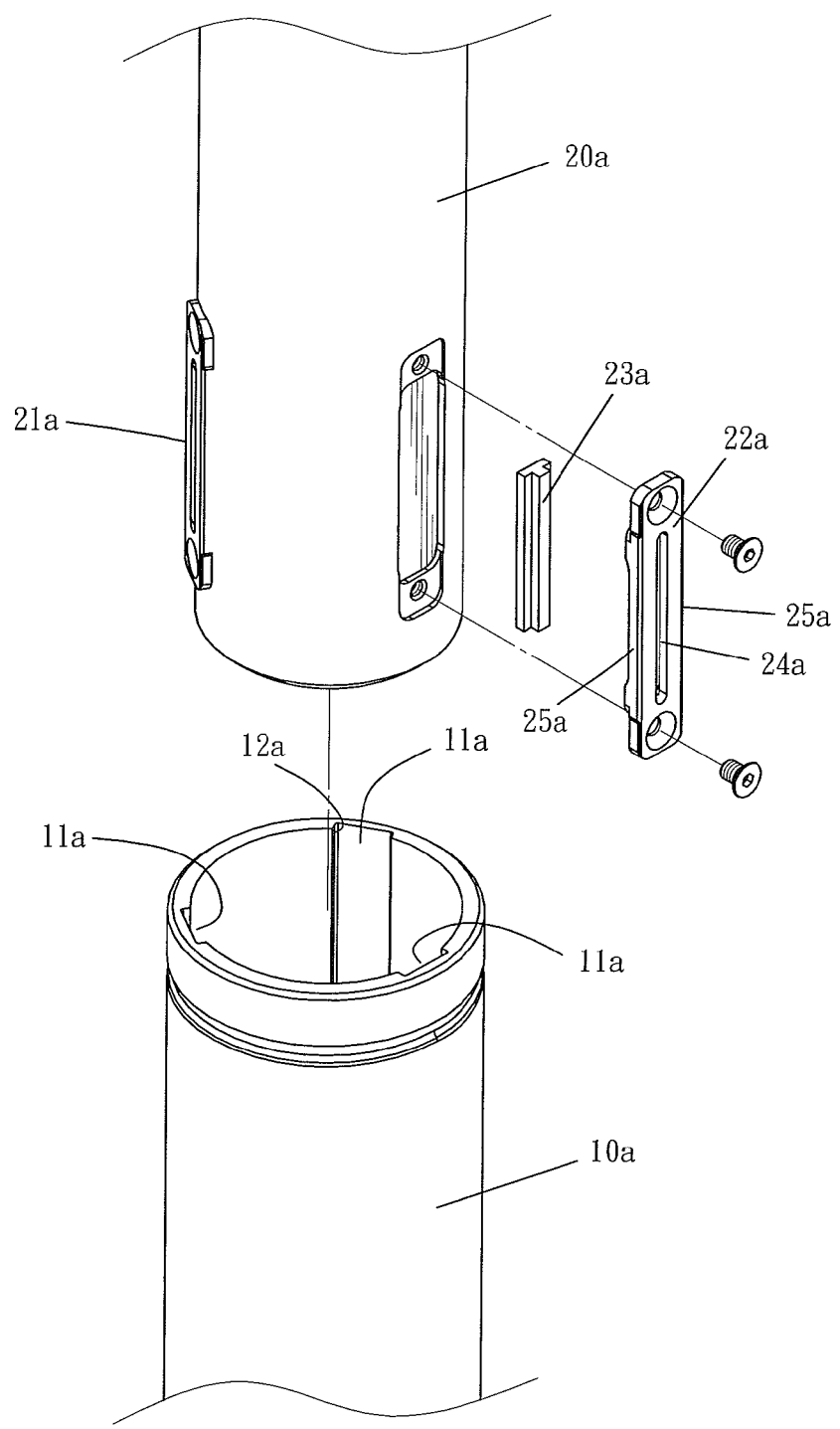
FIG. 7 is an exploded view of a second embodiment of the present invention.
Figure 8:
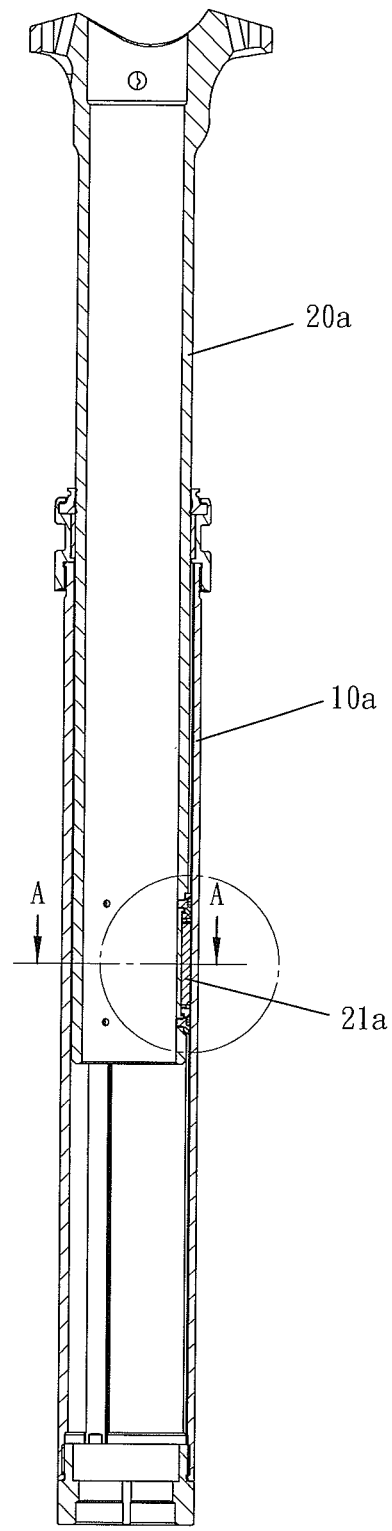
FIG. 8 is a cutaway view of a second embodiment of the present invention in a complete assembled mode.
Figure 9:
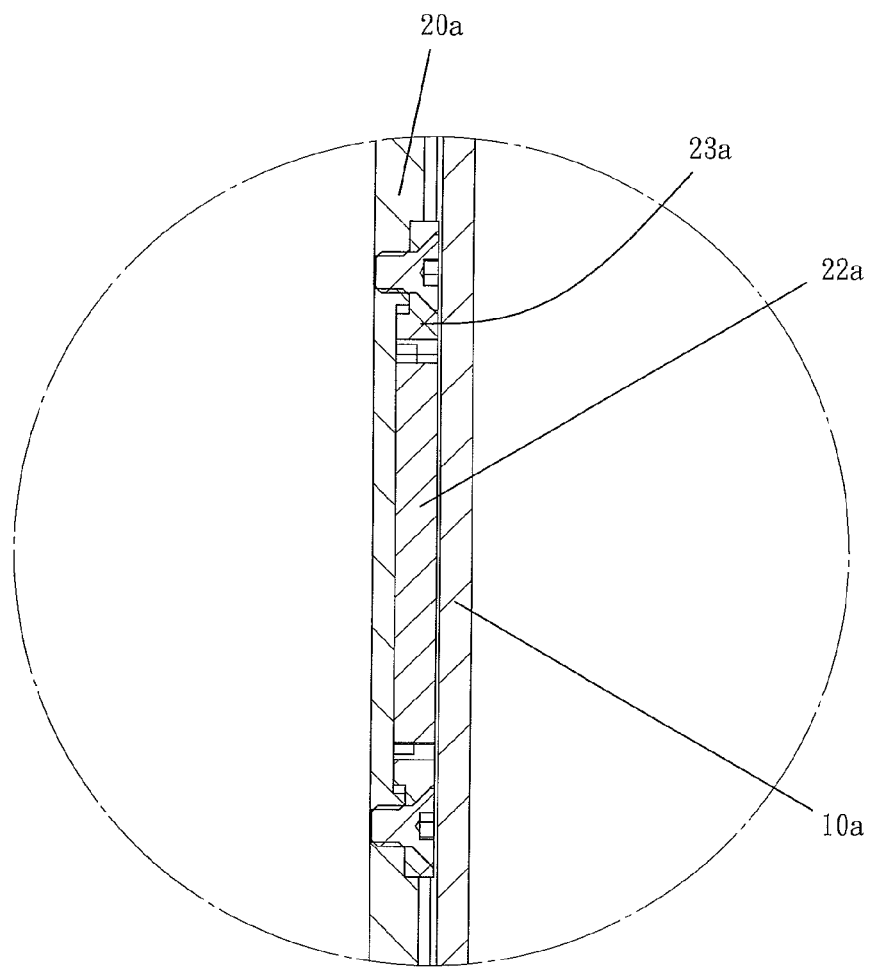
FIG. 9 is an enlarged view of a portion of FIG. 8.

Referring to FIG. 1 to FIG. 6, a first embodiment of the present invention comprises: an outer tube 10 having an internal wall which is provided with a plurality of axial grooves 11 spaced in equidistant arrangement, with two inner sides of said axial grooves 11 respectively disposed with an axial groove wall 12; and an inner tube 20 having an end inserted into said outer tube 10, provided with an outer wall, at the position relative to each axial groove 11 of said outer tube 10, and screwed respectively with a direction restricting element 21 by a screw piece 200. Said direction restricting element 21 protrudes from the outer wall of said inner tube 20 and is allowed to be inserted into the axial grooves 11 of said outer tube 10. Said direction restricting element 21 includes a resilient unit 23 shaped in a long strip and a slider 22 with elasticity and abrasion resistance. The center of said slider 22 is provided with an axial opening 24 of which the radial diameter is less than the radial width of said resilient unit 23 to allow the resilient unit 23 to be inserted into the axial opening 24 and to be fastened. When said resilient unit 23 is inserted into the axial opening 24 of the slider 22, the axial outer walls 25 of the slider 22 are pushed outwards by the tension of the resilient unit 23, as shown in FIG. 5 and FIG. 6.

Referring to FIG. 3 to FIG. 6, when the inner tube 20 is inserted into the outer tube 10, the slider 22 of the direction restricting element 21 arranged on the inner tube 20 is also inserted into the axial groove 11 of the outer tube 10, and the axial outer walls 25 of the slider 22 are pushed outwards by the tension of the resilient unit 23 to engage with the axial groove walls 12 to eliminate the interspace between the slider 22 and the axial groove 11, as shown in FIG. 5 and FIG. 6, and further to prevent deflection and wobble when the inner tube 20 and the outer tube 10 rotate relative to each other. Moreover, the direction restricting element 21 is fastened to the inner tube 20, so that each direction restricting element 21 will keep fixed without breaking away from the inner tube 20.

Figure 10:
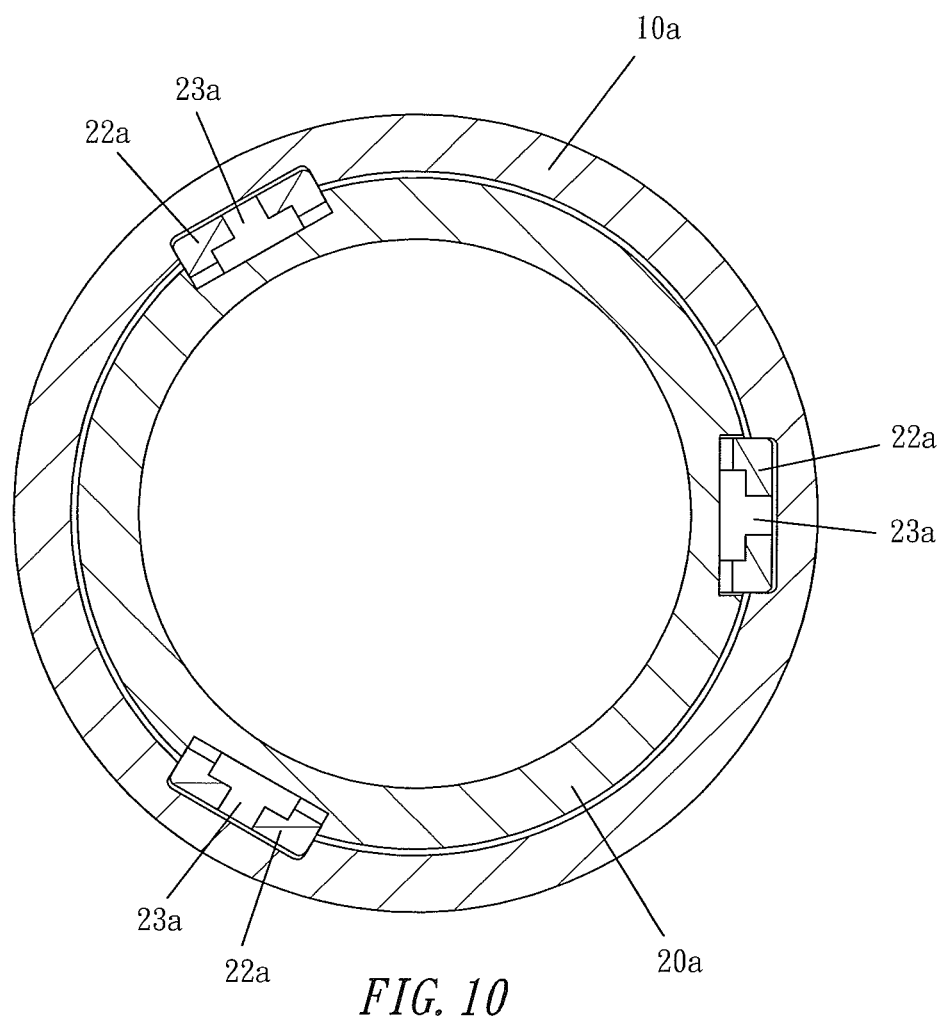
FIG. 10 is a cross-sectional view along line A-A shown in FIG. 8.
Figure 11:
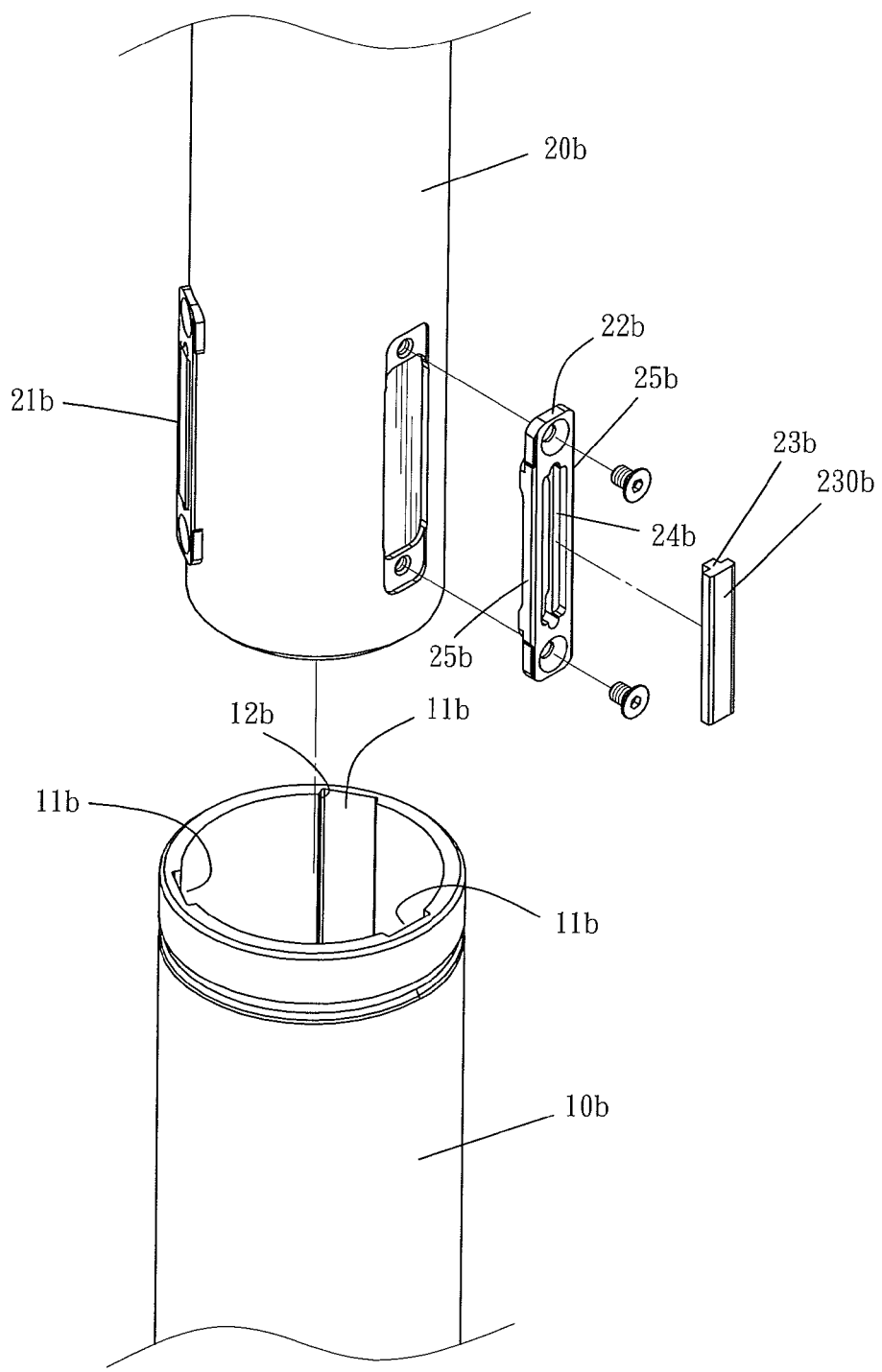
FIG. 11 is an exploded view of a third embodiment of the present invention.
Figure 12:
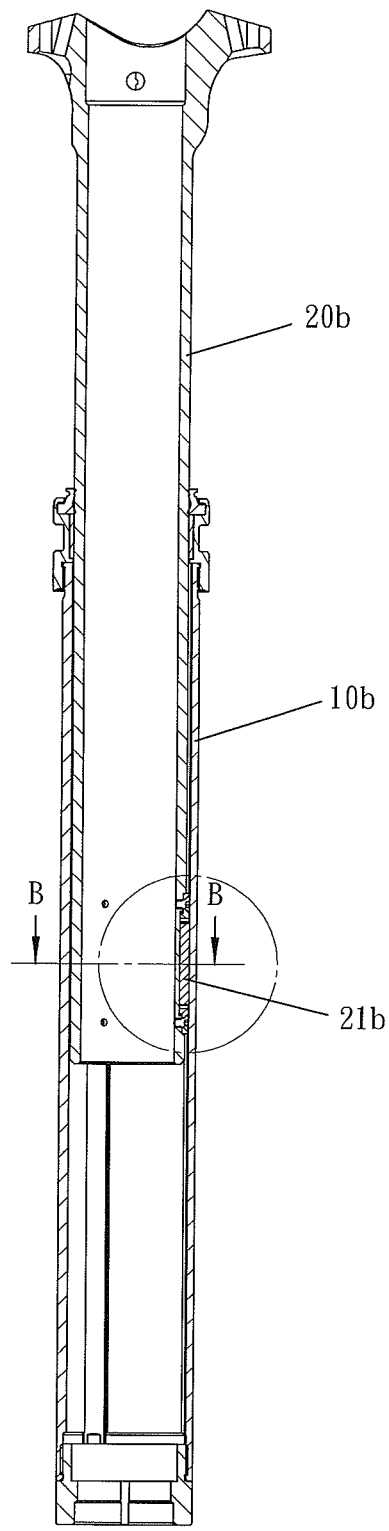
FIG. 12 is a cutaway view of a third embodiment of the present invention in a complete assembled mode.
Figure 13:
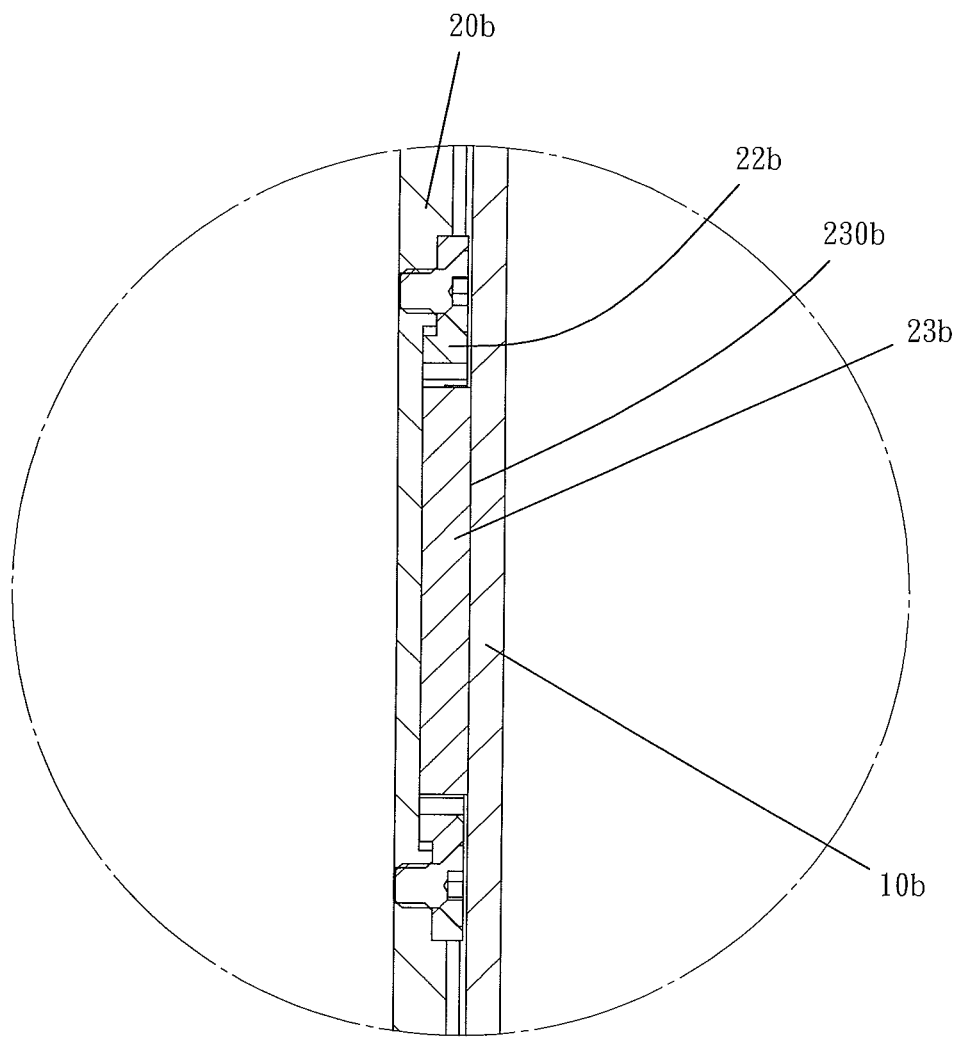
FIG. 13 is an enlarged view of a portion of FIG. 12.

Referring to FIG. 7 to FIG. 10, different from the first embodiment of the present invention, the resilient unit 23a of the direction restricting element 21a and the cross section of the axial opening 24a of the slider 22a disclosed in a second embodiment of the present invention are an upside-down T-shape, as shown in FIG. 10, to prevent the upside-down T-shaped resilient unit 23a from sliding out of the axial opening 24a when engaging with each other. The axial outer walls 25a of the slider 22a arranged within the direction restricting element 21a of the inner tube 20a are pushed outwards by the tension of the resilient unit 23a to engage with the axial groove walls 12a of the axial groove 11a on the outer tube 10a. In addition, the further function of a second embodiment is described as the aforesaid in a first embodiment of the present invention.

Figure 14:
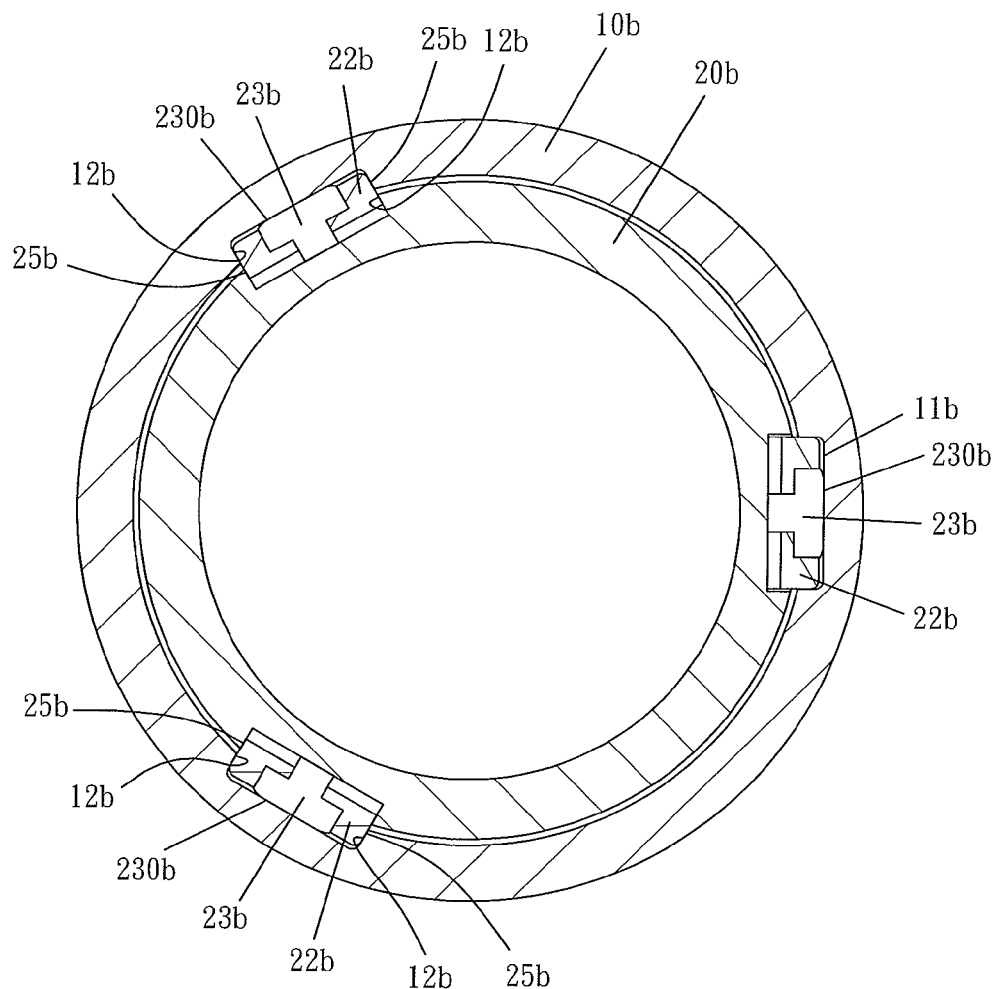
FIG. 14 is a cross-sectional view along line B-B shown in FIG. 12.

Referring to FIG. 11 to FIG. 14, different from the second embodiment of the present invention, the resilient unit 23b of the direction restricting element 21b and the cross section of the axial opening 24b of the slider 22b disclosed in a third embodiment of the present invention are a T-shape, as shown in FIG. 14. The resilient unit 23b and the cross section of the axial opening, 24b of the slider, 22b are a T-shape. When the direction restricting element 21b is inserted into the axial groove 11b of the outer tube 10b, the axial outer walls 25b of the slider 22b arranged within the direction restricting element 21b of the inner tube 20b are pushed outwards by the tension of the resilient unit 23b to engage with the axial groove walls 12b of the axial groove 11b on the outer tube 10b. Said resilient unit 23b has a side 230b facing the axial groove 11b of the outer tube 10b. Moreover, the side 230b is allowed to touch the wall of said axial groove 11b to reinforce the steadiness of both tubes when the inner tube 20b and the outer tube 10b rotate relative to each other, as shown in FIG. 14.

Figure 15:
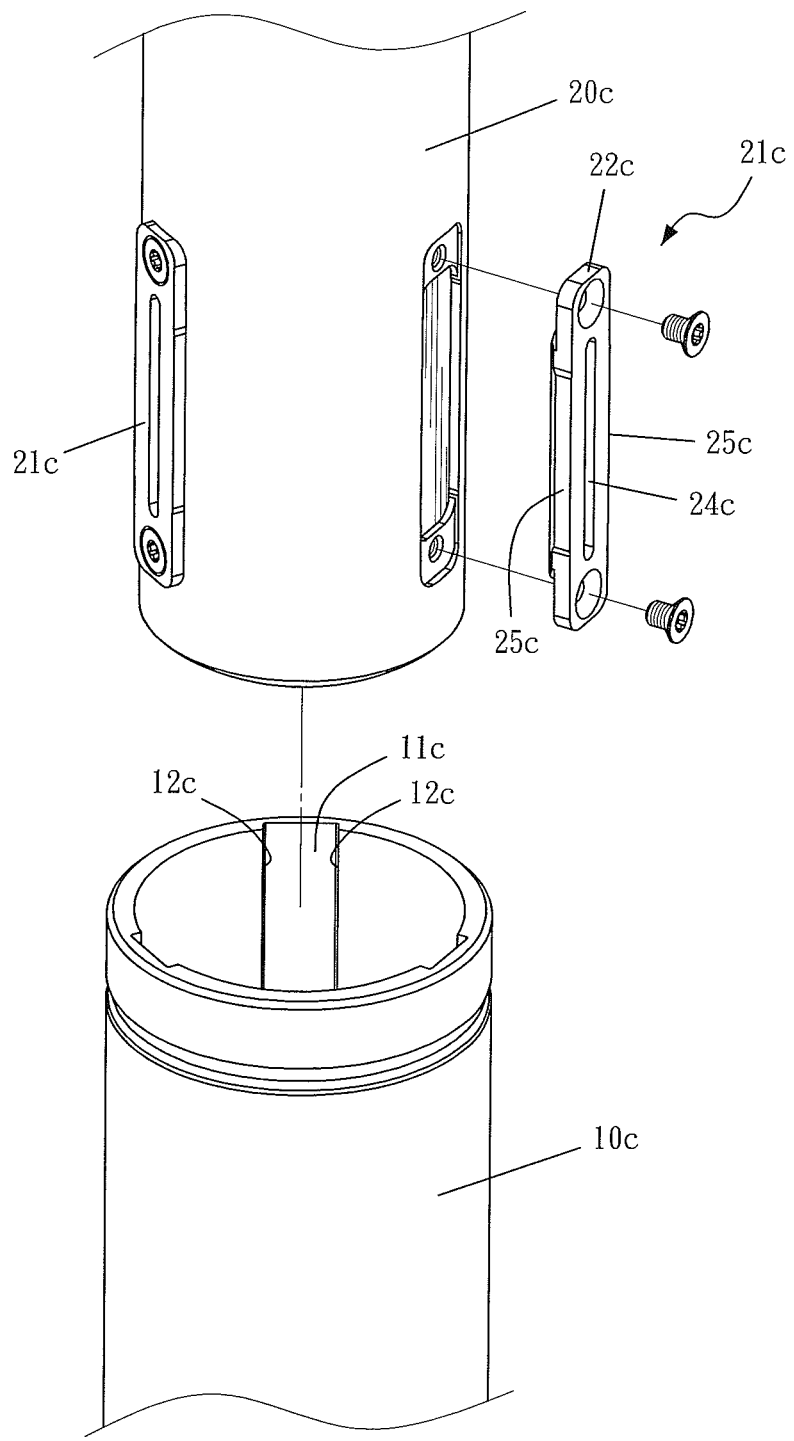
FIG. 15 is an exploded view of a fourth embodiment of the present invention.
Figure 16:
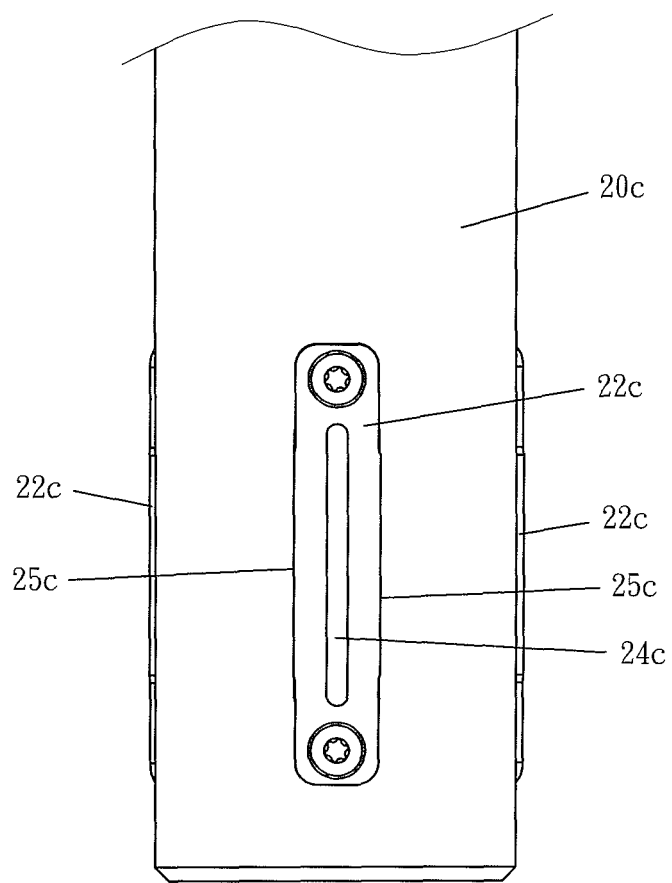
FIG. 16 shows the appearance of the inner tube in accordance with a fourth embodiment of the present invention.
Figure 17:
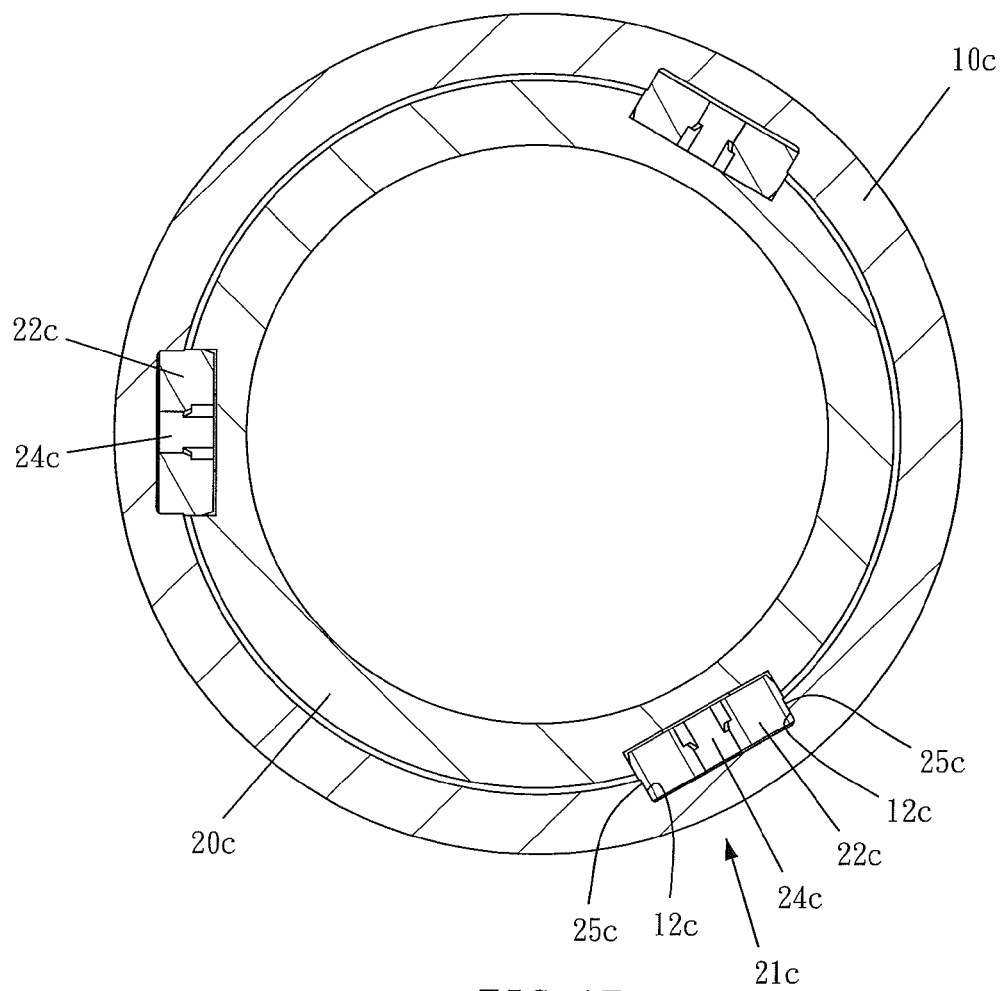
FIG. 17 is a top view showing the cross-section of the inner and outer tubes in a complete assembled mode in accordance with a fourth embodiment of the present invention.

Referring to FIG. 15 to FIG. 17, different from the three aforesaid embodiments of the present invention, the direction restricting element 21c disclosed in a fourth embodiment of the present invention is not arranged with a resilient unit. Said direction restricting element 21c disclosed in a fourth embodiment only includes a slider 22c with elasticity and abrasion resistance provided with an axial opening 24c in the middle. The slider 22c is a little greater than the axial groove 11c in width. When said slider 22c is inserted into said axial groove 11c, the axial outer walls 25c of said slider 22c may be squeezed to be inserted into the axial groove 11c. Thus, the axial outer walls 25c of said slider 22c and the axial groove walls 12c of the axial groove 11c may engage each other to eliminate the interspace between the slider 22c and the axial groove 11c, as shown in FIG. 17, to prevent deflection and wobbling as well as to reinforce the steadiness of both tubes when the inner tube 20c and the outer tube 10c rotate relative to each other.

Figure 18:
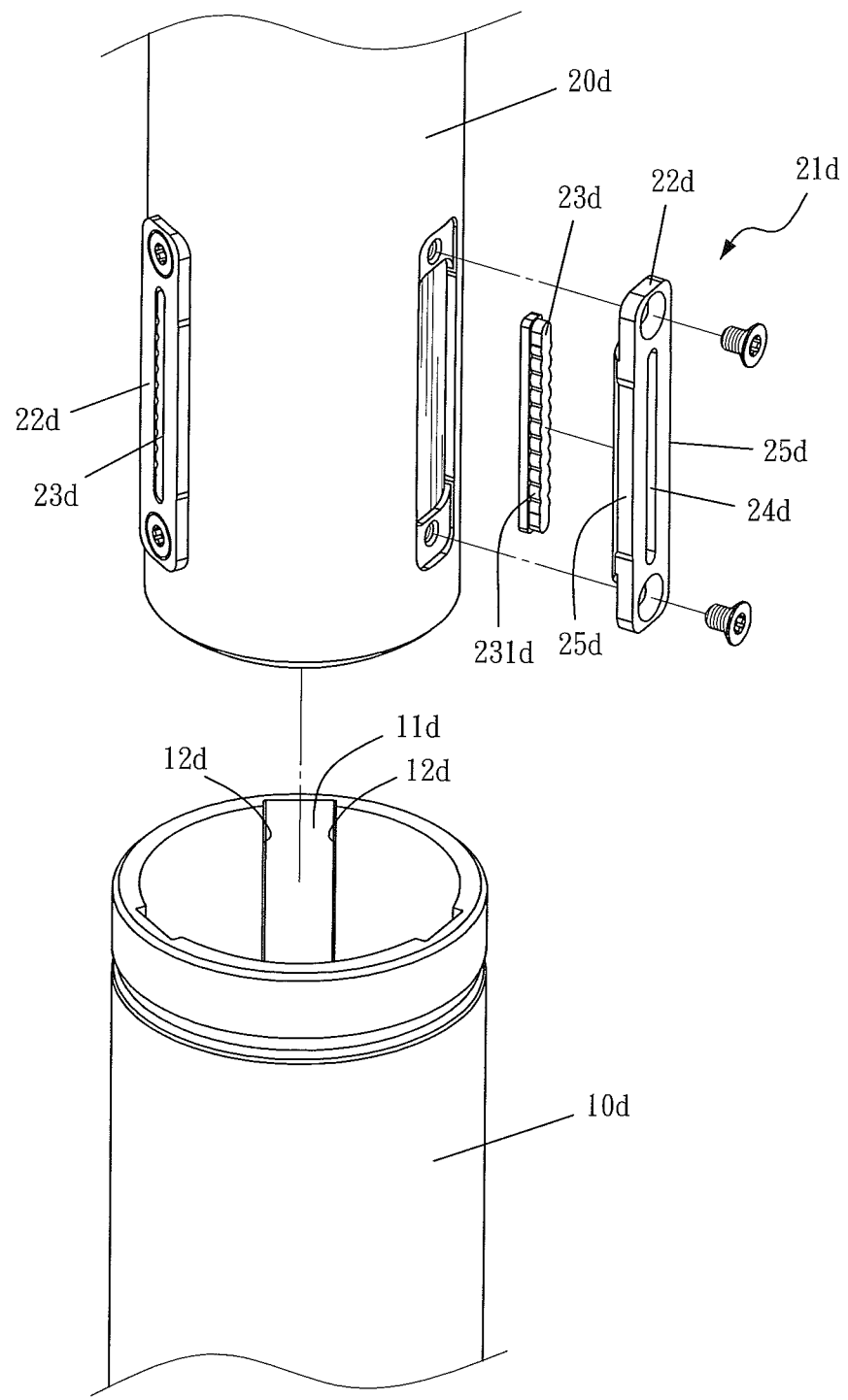
FIG. 18 is an exploded view of a fifth embodiment of the present invention.
Figure 19:
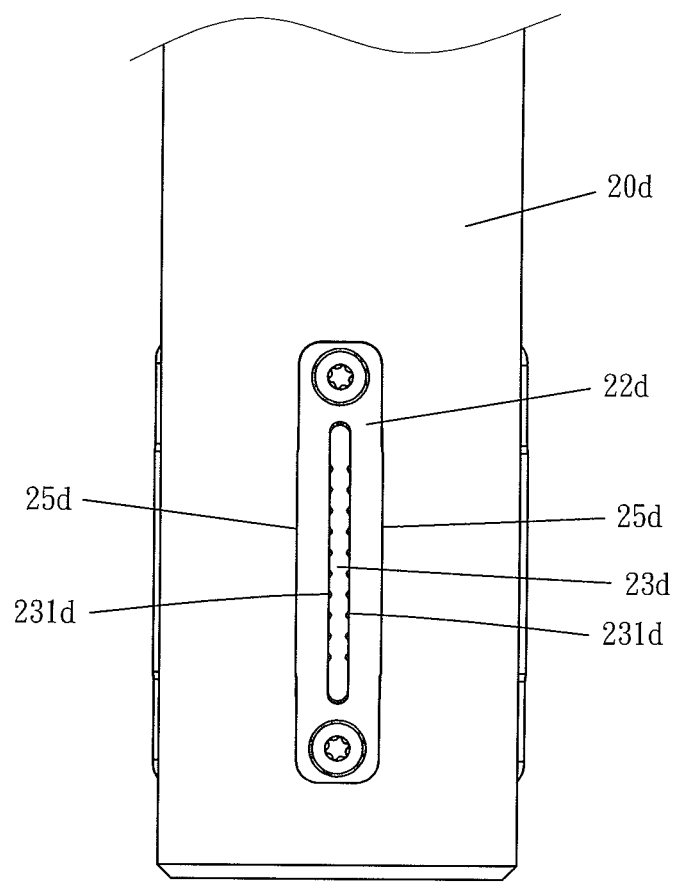
FIG. 19 shows the appearance of the inner tube in accordance with a fifth embodiment of the present invention.
Figure 20:
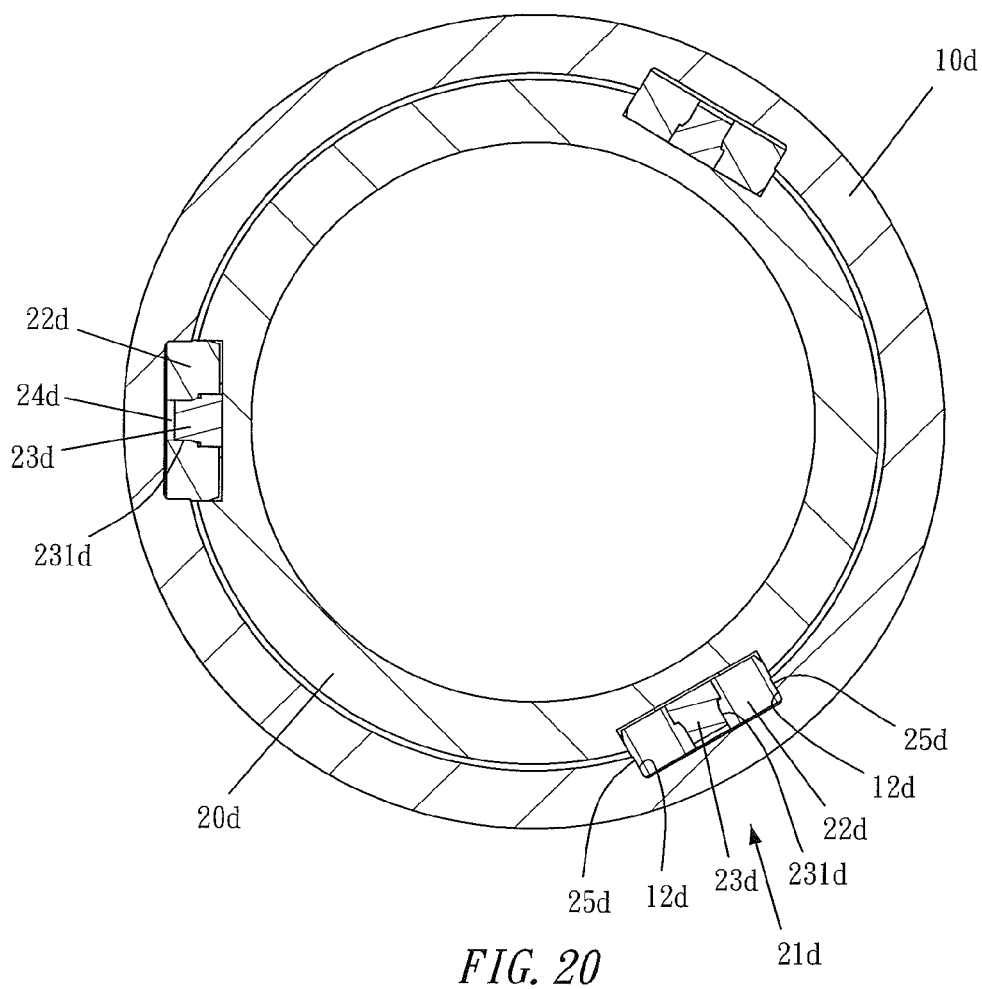
FIG. 20 is a top view showing the cross-section of the inner and outer tubes in a complete assembled mode in accordance with a fifth embodiment of the present invention.

Referring to FIG. 18 to FIG. 20, different from the fourth embodiment of the present invention, the axial opening 24d of the slider 22d arranged within the direction restricting element 21d disclosed in a fifth embodiment of the present invention is allowed to receive a resilient unit 23d having a tooth face 231d that faces the longitudinal outer walls of the axial opening 24d, as shown in FIG. 18, so that the elasticity effect of the resilient unit 23d is augmented. When the resilient unit 23d is inserted into the axial opening 24d of the slider 22d, the axial outer walls 25d of the slider 22d are pushed outwards by the tension of the resilient unit 23d to engage with the axial groove walls 12d of the axial groove 11d to eliminate the interspace between the slider 22d of the direction restricting element 21d and the axial groove 11d of the inner and outer tubes to prevent deflection and wobbling of the tubes when the inner tube 20d and the outer tube 10d rotate relative to each other.

According to the aforementioned, as shown in the present invention, the axial outer walls 25, 25a, 25b, 25c, 25d of the slider 22, 22a, 22b, 22c, 22d are allowed to engage with the axial groove walls 12, 12a, 12b, 12c, 12d of the axial groove 11, 11a, 11b, 11c, 11d arranged on the outer tube 10, 10a, 10b, 10c, 10d to eliminate the interspace between the slider 22, 22a, 22b, 22c, 22d of the inner tube 20, 20a, 20b, 20c, 20d and the axial groove 11, 11a, 11b, 11c, 11d of the outer tube 10, 10a, 10b, 10c, 10d to prevent deflection and wobbling when the inner tube 20, 20a, 20b, 20c, 20d is inserted into the outer tube 10, 10a, 10b, 10c, 10d.

The direction restricting element 21, 21a, 21b, 21c, 21d disclosed in the aforesaid embodiments of the present invention is configured on the outer wall of the inner tube 20, 20a, 20b, 20c, 20d. Said direction restricting element 21, 21a, 21b, 21c, 21d is also allowed to be arranged on the inner wall of the outer tube 10, 10a, 10b, 10c, 10d. The axial grooves 11, 11a, 11b, 11c, 11d are disposed to the outer wall of the inner tube 20, 20a, 20b, 20c, 20d when the direction restricting element 21, 21a, 21b, 21c, 21d is arranged on the inner wall of the outer tube 10, 10a, 10b, 10c, 10d.

I claim:

1. A direction restricting device for a bicycle seat post, comprising:
   an outer tube axially slideably receiving an inner tube in a slide direction, with each of the outer and inner tubes terminating in opposite free ends, with the outer tube including an annular inner wall having circular cross sections perpendicular to the slide direction and the inner tube including an annular outer wall having circular cross sections perpendicular to the slide direction of a size for slideable receipt in the cross sections of the annular inner wall, wherein one of the annular inner and outer walls is provided with an axial groove extending between the opposite free ends in the slide direction, wherein the axial groove includes first and second axial inner walls spaced a groove distance perpendicular to the slide direction, wherein the first and second axial inner walls are parallel, wherein another of the annular inner and outer walls at a position relative to the axial groove is arranged with a direction restricting element insertable into the axial groove;
   wherein said direction restricting element includes a recess extending in the slide direction intermediate and spaced from the opposite free ends in the other of the annular inner and outer walls and for a height less than the inner and outer tubes and the axial groove, wherein the direction restricting element further includes a slider with elasticity and a resilient unit, with the slider received in the recess, wherein said slider has first and second axial outer walls abutting with and sliding on the first and second axial inner walls, wherein the first and second axial outer walls of the slider arranged within said axial groove engage with the first and second axial inner walls of said axial groove, and with the resilient unit inserted intermediate the recess and the slider, wherein the first and second axial outer walls of the slider are pushed apart by the resilient unit to push the first and second axial outer walls of the slider towards the first and second axial inner walls of the axial groove, wherein the slider has first and second ends spaced a height in the slide direction, and wherein the slider includes an axial opening extending in the slide direction and spaced inwardly from the first and second ends.

2. The direction restricting device for the bicycle seat post as claimed in claim 1, wherein the recess and the slider of said direction restricting element is formed in and is fastened to the annular outer wall of the inner tube respectively, and wherein said axial groove is arranged into the annular inner wall of the outer tube.

3. The direction restricting device for the bicycle seat post as claimed in claim 2, wherein said resilient unit has a T-shape with the slider located intermediate a head of the T-shape and the other of the annular inner and outer walls.

4. The direction restricting device for the bicycle seat post as claimed in claim 2, wherein said resilient unit has a T-shape with a head of the T-shape abutting the other of the annular inner and outer walls.

5. The direction restricting device for the bicycle seat post as claimed in claim 1, wherein said resilient unit has a T-shape with the slider located intermediate a head of the T-shape and the other of the annular inner and outer walls.

6. The direction restricting device for bicycle seat post as claimed in claim 1, wherein said resilient unit has a T-shape with a head of the T-shape abutting the other of the annular inner and outer walls.

7. The direction restricting device for the bicycle seat post as claimed in claim 1, wherein said slider before insertion in the axial groove is greater than the axial groove in width perpendicular to the slide direction.

8. The direction restricting device for the bicycle seat post as claimed in claim 1, wherein the axial opening of said direction restricting element receives the resilient unit.

9. The direction restricting device for the bicycle seat post as claimed in claim 8, wherein said resilient unit has first and second tooth faces that face longitudinal outer walls of the axial opening and the first and second axial inner walls of the axial groove.

10. The direction restricting device for the bicycle seat post as claimed in claim 9, wherein said slider is fastened to the annular outer wall of the inner tube, and wherein said axial groove is arranged on the annular inner wall of the outer tube.

11. The direction restricting device for the bicycle seat post as claimed in claim 1, wherein the resilient unit is inserted into the axial opening.

12. The direction restricting device for the bicycle seat post as claimed in claim 11, wherein the height of the slider is less than the inner and outer tubes and the axial groove and received in the height of the recess.

\* \* \* \* \*